Feb. 5, 1935.   R. W. GRENELL   1,990,231.
METHOD OF MAKING HALF TONE SCREENS
Filed Sept. 9, 1932   4 Sheets-Sheet 2

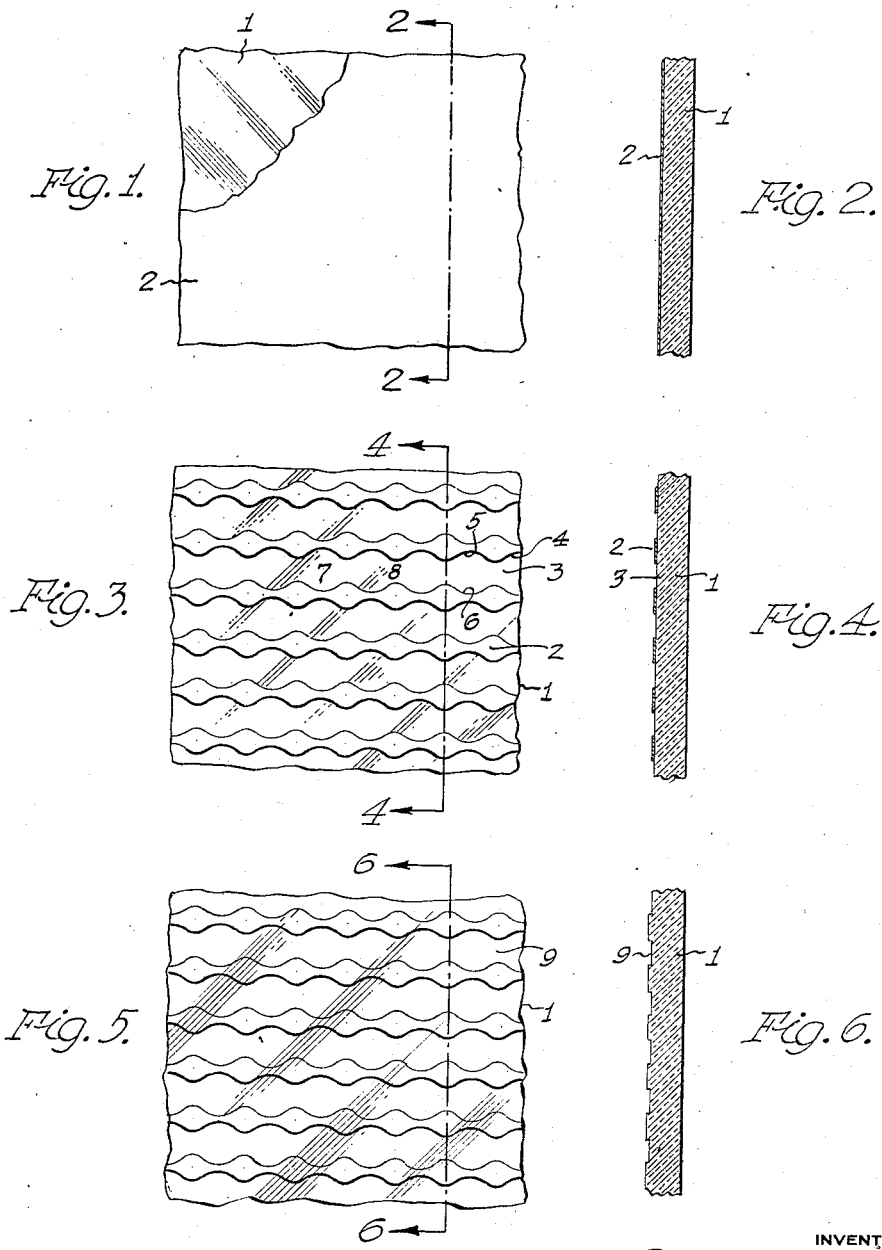

INVENTOR
Ralph W. Grenell,
BY
ATTORNEYS

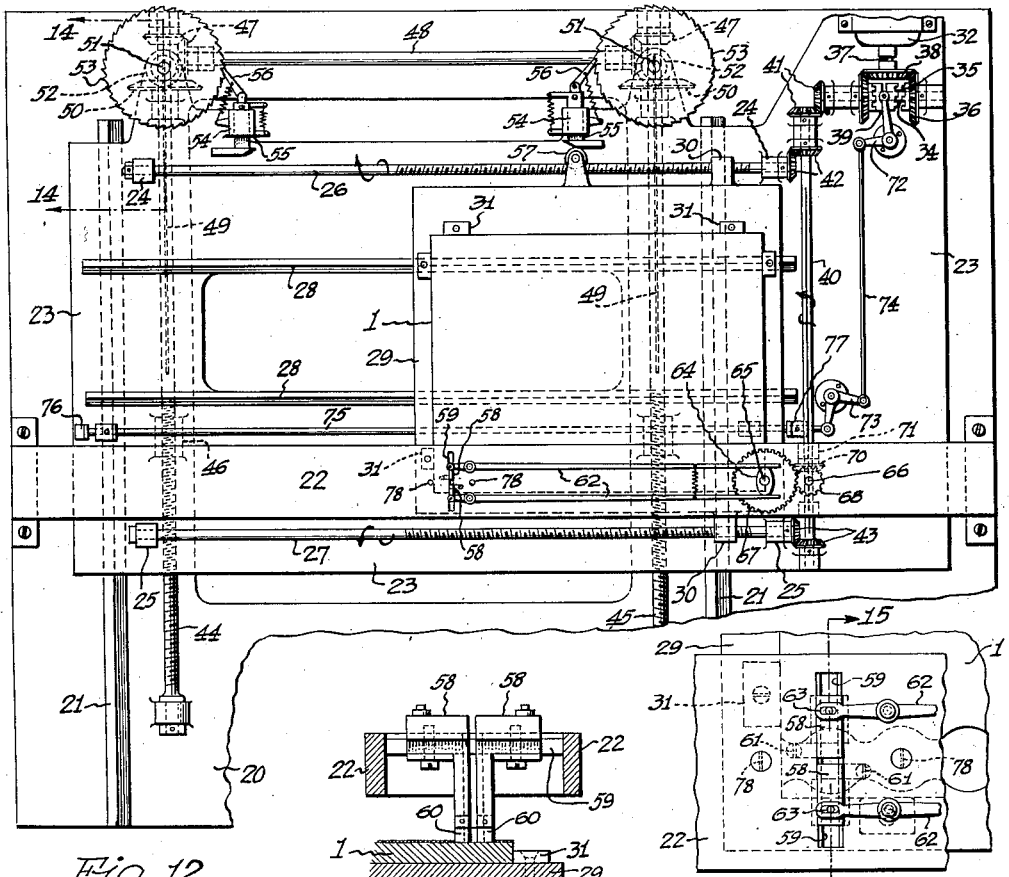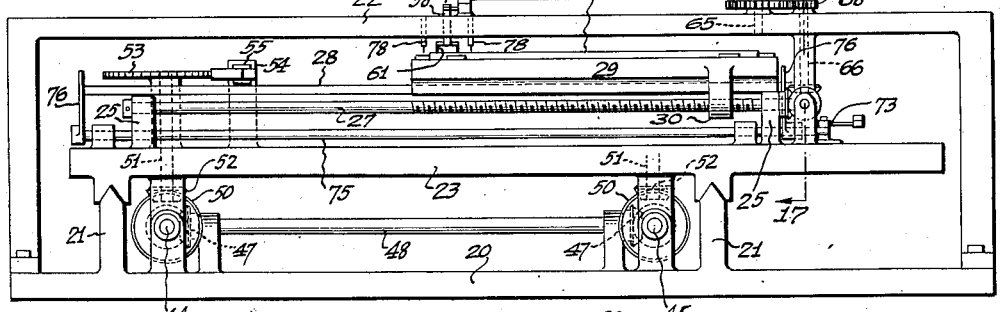

Feb. 5, 1935.   R. W. GRENELL   1,990,231
METHOD OF MAKING HALF TONE SCREENS
Filed Sept. 9, 1932   4 Sheets-Sheet 4

INVENTOR
Ralph W. Grenell,
BY
ATTORNEYS

Patented Feb. 5, 1935

1,990,231

UNITED STATES PATENT OFFICE 1,990,231

METHOD OF MAKING HALF TONE SCREENS

Ralph W. Grenell, Detroit, Mich.

Application September 9, 1932, Serial No. 632,404

3 Claims. (Cl. 95—81)

The ordinary half tone screen comprises two glass plates having parallel and alternating opaque and transparent lines or bands. The plates are placed one over the other with the bands of one intersecting those of the other, thereby providing a checkerboard formation of very small opaque and transparent spots. Owing to the fact that the bands are perfectly straight, the resulting spots are square. The square spots cause loss of light by dispersion in the corners thereof.

The object of the present invention is to avoid this loss of light and to enable a more complete and efficient passage of light through the screen. This result is accomplished by the provision of a transparent spot which may be conceived as originally square with its corners cut or rounded off. This is the fundamental concept of the invention, and although the description is confined to a circular spot and the means of producing it, the circular spot is to be regarded for present purposes as a polygonal spot having an infinite number of sides. One of the characteristics of an originally square spot with its corners cut off, pertinent to the invention, is that the internal angles of such a polygon exceed ninety degrees.

The dimensions of the transparent and opaque areas are so minute that a special machine is required to make them, and another object of the invention resides in the provision of such a machine. The machine scrapes undulating transparent bands on the coated glass plates, and after the usual etching and filling treatments, similar undulating transparent bands remain on the plates. Two such plates are superimposed with the bands of one intersecting the bands of the other. The formation of the bands is such that transparent circular spots are formed at the intersections and the intervening parts are obstructed by opaque portions of the adjacent plate.

The invention is fully disclosed by way of example in the following description and in the accompanying drawings, in which—

Figure 1 is an elevation of the coated glass plate prior to being scraped;

Fig. 2 is a section on line 2—2 of Figure 1;

Fig. 3 is an elevation of the glass plate after being scraped;

Fig. 4 is a section on line 4—4 of Figure 3;

Fig. 5 is an elevation of the plate after being etched and cleaned;

Fig. 6 is a section on line 6—6 of Figure 5;

Fig. 12 is a plan view of the machine for scraping the plates;

Fig. 13 is a side elevation thereof;

Fig. 14 is a section on the line 14—14 of Figure 12;

Fig. 15 is a section approximately on line 15—15 of Figure 16;

Fig. 16 is a detail plan view of the scraping member;

Fig. 17 is a section on line 17—17 of Figure 13;

Reference to these views will now be made by use of like characters which are employed to designate corresponding parts throughout.

Figure 7:
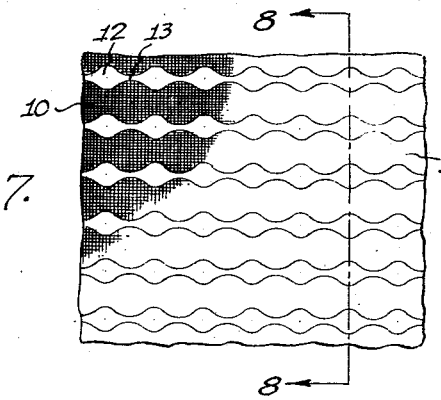
Fig. 7 is an elevation of the plate showing the etched grooves filled.
Figure 8:
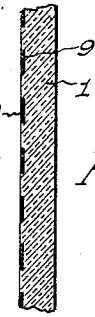
Fig. 8 is a section on line 8—8 of Figure 7.
Figure 9:
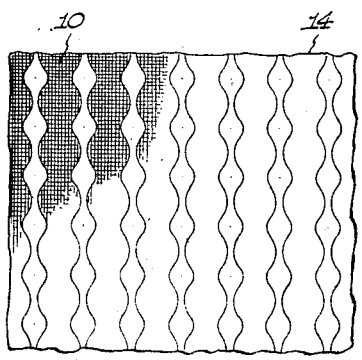
Fig. 9 is an elevation of the companion plate to be superimposed on the plate shown in Figure 7.

In Figures 1 and 2 is illustrated a glass plate 1 of the character employed in the making of half tone screens. One surface of the plate is coated at 2 with asphaltum or other suitable material ordinarily employed in this class of work.

The coated surface is scraped, by means presently to be described, in a manner to form parallel grooves 3, the edges 4 of which are regularly sinuous, as shown in Figures 3 and 4. The edges of any given groove, if conceived as sine curves, may be regarded as being 180° apart with respect to a line drawn perpendicular to the axis of the curve. Thus, the high points 5 of one curve lie directly opposite the low points 6 of the opposite curve, forming alternating enlargements 7 and restrictions 8. The several grooves are in transverse alignment, that is, the enlargements 7 are in alignment and the restrictions 8 are in alignment.

Figure 11:
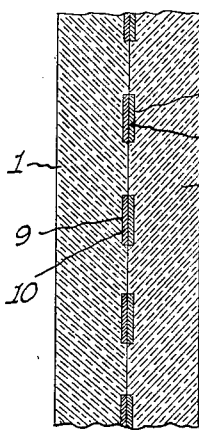
Fig. 11 is a section on line 11—11 of Figure 10.
Figure 10:
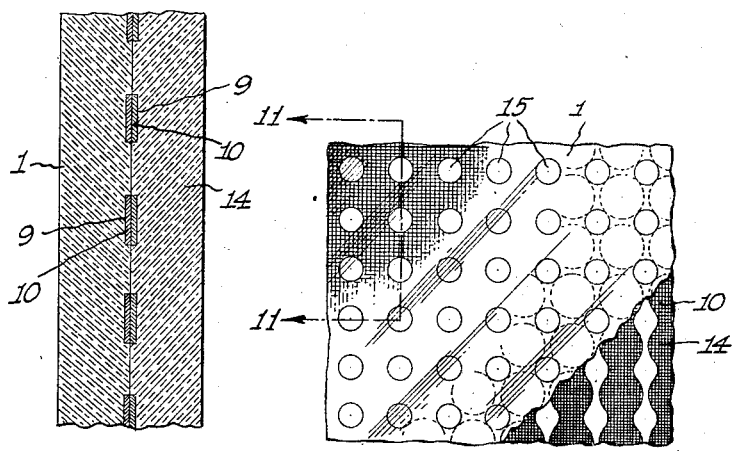
Fig. 10 is an elevation of the screen consisting of the superimposed plates.

After the formation of the grooves, the grooved surface of the plate is subjected to an etching solution whereby the scraped grooves 3 become etched grooves 9, and the coating material 2 is removed, as shown in Figures 5 and 6. The etched grooves 9 are then filled with a suitable opaque substance 10 ordinarily used for this purpose, leaving transparent bands shaped similarly to the filled grooves 9 in that their edges consist also of the sinuous lines 4 forming alternating enlargements 12 and restrictions 13. The sinuous lines 4 are so spaced transversely of the plate that the arcs forming an enlargement are concentric and of equal radius, for a purpose which will presently appear. A similarly prepared glass plate 14 is superimposed upon the plate 1, the treated surfaces being inward as shown in Figure 11, with the grooves of one plate lying at right angles to the grooves of the other plate and the enlargements 12 of both sets of transparent bands being in register to form circular dots 15 which are transparent through both plates. The transparent restrictions 13 of each plate are obstructed by the opaque material 10 of the other plate.

The area of the transparent dots 15 is comparable to the area of the transparent square dots in the ordinary half tone screen. The formation of the circular dots results from the peculiar grooves 3 cut through the coating material 2, and a machine for cutting these grooves is illustrated in Figures 13 to 18.

The machine comprises a base 20 having a pair of parallel rails 21 and provided further with a bridge 22 mounted thereon. A table 23 is slidably mounted on the rails and is formed with two pairs of aligned bearings 24 and 25 supporting respectively two threaded shafts 26 and 27 lying at right angles to the rails 21. The table 23 further carries a pair of rails 28 between and parallel to the shafts 26, 27, and on these rails is slidably mounted a carriage 29.

The carriage is provided with nuts 30 fixed thereto and threaded on the shafts 26, 27, so that the carriage is moved on its rails 28 on rotation of the shafts by the means presently to be described. Adjustable clamping members 31 are suitably mounted upon the carriage 29 so that the covered glass plate 1 to be scraped may be secured upon the carriage.

The shafts 26 and 27 are rotated from a suitable power source such as an electric motor 32 mounted upon the movable table 23. A shaft 34 is journalled upon the table in parallel relation to the shaft 26 and loosely carries opposed clutch elements 35 fixed respectively to opposed bevel pinions 36. The shaft 37 of the motor carries a bevel pinion 38 in constant mesh with the pinions 36. An intermediate clutch element 39 is splined on the shaft 34 and adapted for selective engagement with the elements 35 so that the shaft 34 may be turned in either direction according to the position of the element 39.

A transmission shaft 40 is journalled upon the table 23 perpendicular to the shafts 26, 27 and along one end thereof. The shaft 40 is geared to the shaft 34 at 41 and again to the shafts 26, 27 at 42 and 43 respectively.

Two more threaded shafts 44 and 45 are journalled on the base 20 in parallel relation to the rails 21 and are engaged by nuts 46 carried by the table 23, so that the table is moved on the rails 21 on turning of these shafts. The shafts 44, 45 further carry pinions 47 (Figure 15) fixed thereon and geared together through the medium of another shaft 48 also journalled on the base. The shafts 44, 45 are splined at 49 and carry slidably mounted gears 50 respectively. The table 23 further carries vertical stub shafts 51 provided at their lower ends with pinions 52 meshing respectively with the slidable gears 50 and are provided at their upper ends with mutually opposed ratchets 53. Adjacent each ratchet, the table is formed with a boss 54 accommodating a slidable plunger 55 carrying a pawl 56 engageable with the corresponding ratchet 53. The carriage 29 carries a roller 57 adapted to ride beneath and lift the plungers 55 in either direction of movement of the carriage. On engagement of the roller with either plunger, the shafts 44, 45 are turned in the same direction, and the table 23 is thus advanced on the rails 21.

The cutting mechanism comprises a pair of blade holders 58 slidably supported in a slot 59 formed through the bridge 22. In the lower ends of the holders are secured scrapers 60 having their cutting edges 61 (Figure 17) offset at opposite sides of the axis of the slot 59 whereby one of the cutters is at the bottom of a sinuous curve while the other is at the top of the companion curve, and vice versa. The holders 58 are oscillated by means of a pair of levers 62 of the first class mounted on the bridge and attached respectively to the holders as indicated by the numeral 63. The power ends of the levers are held in contact with an elliptical cam 64 mounted on a vertical shaft 65 in the bridge. There is a high reduction from the power arm to the weight arm of each lever in order to reduce the stroke of the cutters to dimensions of the order of the screen openings. The shaft 65 is geared to a vertical shaft 66 in the bridge 22 at a 1:2 speed ratio by means of a gear 67 on the shaft 65 and the pinion 68 on the shaft 66. The lower end of the shaft 66 carries a pinion 69 (Figure 18) meshing with another pinion 70 splined on the shaft 40 and backed by an ear 71 depending from the bridge 22 and holding the pinion 70 against the pinion 69. Thus, although the shafts 65 and 66 are in the fixed bridge 22, a constant drive thereto from the shaft 40 is made possible notwithstanding the sliding movement of this shaft with the table 23 on which it is mounted.

The intermediate element 39 of the reversing clutch is actuated through a pair of bell cranks 72 and 73 mounted on the movable table 23, joined together by a link 74 and connected respectively to this element and to a rod 75 slidably supported on the table in parallel relation to the rails 28 or the direction of movement of the carriage 29. The rod carries fixed stops 76 and 77 at points selected to determine the limits of movement of the carriage in either direction. Assuming that the carriage is being driven to the left with reference to Figure 13, it will strike the stop 76 and reverse the clutch, returning the carriage to the right until the latter engages the stop 77 to effect another reversal. At each terminal position of the carriage, one of the plungers 55 is lifted to advance the table 23 and hence the carriage 29 transversely along the rails 21, as previously indicated.

During rotation of the shaft 40, the cam 64 causes the scrapers 60 alternately to recede from and advance toward each other so that they cut along the dotted lines shown in Figure 17. The cutting edges 61 may be so wide that their paths overlap, thereby removing all the coating material between the dotted lines. In the construction shown in Figure 15, however, the paths of the edges 61 do not overlap, and there are provided fixed scrapers 78 mounted in the bridge 22 and extending to the center of the groove to be formed, whereby to remove the material which remains between the paths of the cutting edges 61.

The dimensioning of the gearing and the thread of the shafts 26, 27 is such as to move the carriage 29 the distance between centers of enlargements of the scraped bands, during one revolution of the shaft 40. The member 64 is a double cam adapted to produce two complete oscillations of the tool holders 58 on each revolution of the shaft 65, and since only one oscillation is necessary between centers, the speed of the shaft 65 is reduced in the manner previously described.

Figure 18:
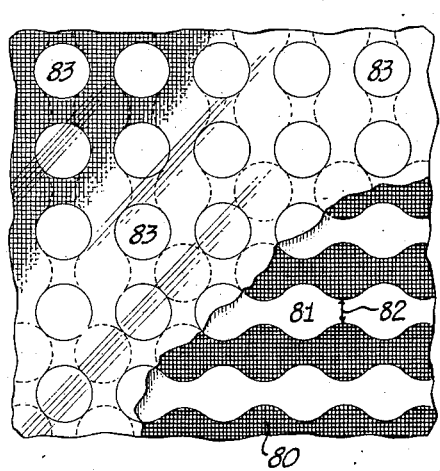
Fig. 18 is an elevation, partly broken away, of a modified form of screen.
Figure 19:
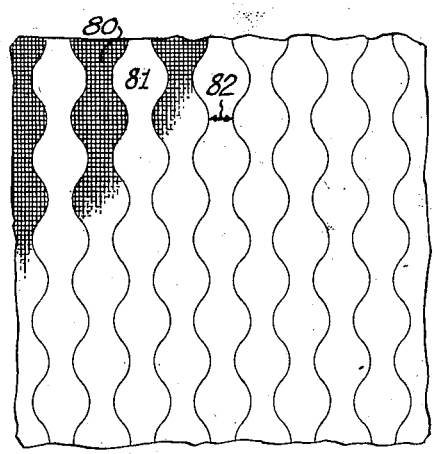
Fig. 19 is an elevation of one of the plates thereof.
Figure 20:
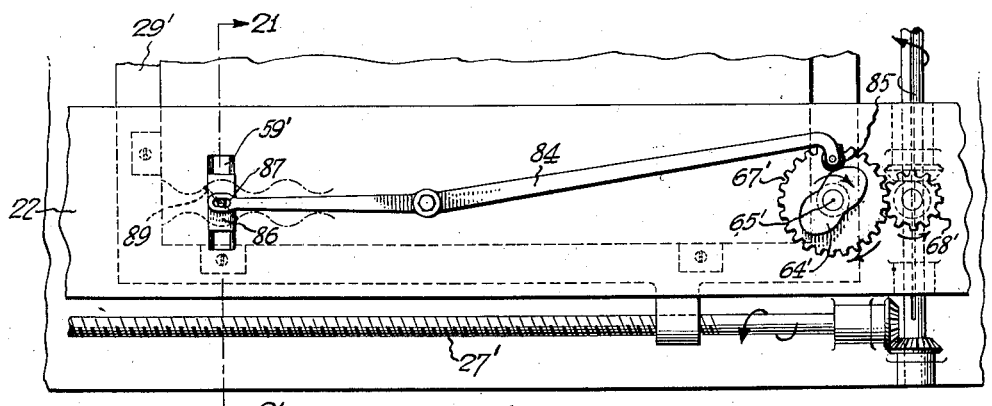
Fig. 20 is a fragmentary plan view of the apparatus for scraping the plates for Figures 18 and 19.
Figure 21:
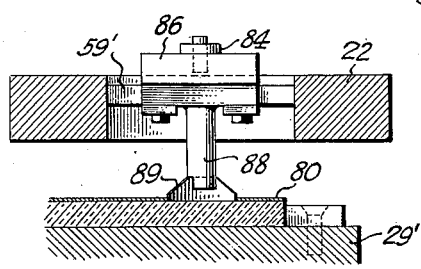
Fig. 21 is a section on the line 21—21 of Figure 20.
Figure 22:
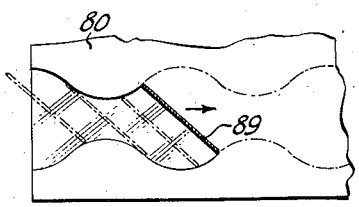
Fig. 22 is a diagrammatic view illustrating the movement of the scraper blade.

In the plates shown in Figures 18 and 19, the filled, opaque bands 80 which were originally scraped are such that the radius of convexity of the narrow parts is equal to the radius of concavity of the wide parts. A band of this character lends itself to scraping by means of a somewhat simplified apparatus which is illustrated in Figures 20, 21 and 22. Two plates of the type shown in Figure 19 are laid one upon the other, with the bands of one at right angles to the bands of the other and with the wide parts 81 of the relief bands 82 of one plate coincident with similar parts of the other plate, to form relief or transparent circular spots 83 through both plates as shown in Figure 18.

The scraping machine for forming this style of plate is similar to that already described except for the scraping blade and the means for actuating it. The fixed bridge 22' has journalled therein a cam shaft 65' carrying a driven gear 67' and a double elliptical cam 64'. The drive pinion 68' meshes with the gear 67'.

On the bridge 22' is pivotally mounted a lever 84 of the first class, carrying at one end a roller 85 which engages the cam 64'. The bridge is further formed with a guide slot 59' lying transversely of the direction of movement of the carriage 29' by the propelling screw 27. Slidably mounted in the slot 59' is a blade holder 86 having a slot and pin connection 87 to the remaining end of the lever 84. The holder has a depending stem 88 carrying at its lower end a single scraper blade 89 having its edge lying at an angle to the axis of the groove to be scraped.

The cam 64' is so calculated with reference to the rate of lengthwise movement of the carriage and the dimensions of the lever 84 to cause the ends of the blade to describe similar sinuous paths, with one path lagging 180° behind the other. In other words, the edge of the blade 89 is given a parallel wavy motion as illustrated in Figure 22, wherein the full wavy lines represent the edges of the groove already formed.

Although specific embodiments of the invention have been illustrated and described, it will be understood that various alterations in the details of construction may be made without departing from the scope of the invention, as indicated by the appended claims.

What I claim is:

1. The method of producing a half tone screen consisting in forming on otherwise opaque plates, parallel transparent bands each of which undulates symmetrically with respect to its longitudinal axis, and superimposing one of said plates upon another, such that the bands of one are perpendicular to the bands of the other and the wider parts of the bands of one plate coincide with the wider parts of the bands of the other plate, whereby circular transparent spots through both plates are formed at the points of intersection of the bands.

2. The method of making half tone screens which consists in covering one side of a pair of plates with a coating material, scraping the plates to form parallel grooves in the coating with the edge of the grooves regularly sinuous, subjecting the grooved surfaces to an etching solution whereby the scraped grooves become etched grooves, removing the coating material, filling the etched grooves with opaque material, and superimposing one of said plates on the other.

3. The method of making half tone screens which consists in covering one side of a pair of plates with a coating material, scraping the plates to form parallel grooves in the coating with the edge of the grooves regularly sinuous, subjecting the grooved surfaces to an etching solution whereby the scraped grooves become etched grooves, removing the coating material, filling the etched grooves with opaque material, said etched grooves defining parallel transparent bands each of which undulates symmetrically with respect to its longitudinal axis, and superimposing one of said plates upon the other so that the bands of one plate are perpendicular to the bands of the other plate and the wider parts of the transparent bands of one plate coincide with the wider parts of the bands of the other plate, whereby circular transparent spots through both plates are formed at the points of intersection of the transparent bands.

RALPH W. GRENELL.